US010613724B2

(12) United States Patent
Eun et al.

(10) Patent No.: US 10,613,724 B2
(45) Date of Patent: Apr. 7, 2020

(54) CONTROL METHOD FOR SELECTING AND PASTING CONTENT

(71) Applicant: Samsung Electronics Co., Ltd., Suwon-si, Gyeonggi-do (KR)

(72) Inventors: Dong Jin Eun, Bucheon-si (KR); Sang Hyuk Koh, Seoul (KR); Chang Hwan Kim, Seoul (KR); Heung Kyo Seo, Seoul (KR); Chi Hoon Lee, Seoul (KR); Jung Eui Seo, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 59 days.

(21) Appl. No.: 15/678,723

(22) Filed: Aug. 16, 2017

(65) Prior Publication Data

US 2018/0052591 A1 Feb. 22, 2018

(30) Foreign Application Priority Data

Aug. 18, 2016 (KR) .................. 10-2016-0104602

(51) Int. Cl.
*G06F 3/0484* (2013.01)
*G06F 9/54* (2006.01)
(Continued)

(52) U.S. Cl.
CPC ........ *G06F 3/04845* (2013.01); *G06F 3/0236* (2013.01); *G06F 3/0482* (2013.01);
(Continued)

(58) Field of Classification Search
CPC .. G06F 3/04845; G06F 3/0484; G06F 3/0486; G06F 3/04883; G06F 9/543; G06F 2203/04803
See application file for complete search history.

(56) References Cited

U.S. PATENT DOCUMENTS 5,404,442 A * 4/1995 Foster .................. G06F 3/0481
715/210
5,801,693 A * 9/1998 Bailey ..................... G06F 9/543
715/769
(Continued)

FOREIGN PATENT DOCUMENTS

CN       105653157 A    6/2016
EP       2 336 851 A2   6/2011
(Continued)

OTHER PUBLICATIONS

European Office Action dated May 6, 2019; Reference: P267243EP/ SMCP Application #/Patent #: 17841675.6-1221 PCT/ KR2017008906.

(Continued)

*Primary Examiner* — Mandrita Brahmachari
(74) *Attorney, Agent, or Firm* — Jefferson IP Law, LLP

(57) ABSTRACT

An electronic device is provided. The electronic device includes a display, a memory, and a processor configured to be electrically connected with the display and the memory. The processor is configured to display first content on a first screen region of the display, obtain at least a partial region of the first content as a copy region in response to a user input associated with a copy, display at least part of data corresponding to the copy region as second content on the display, and maintain a state of a second screen region which displays the second content is displayed while the first content is changed to another content.

14 Claims, 12 Drawing Sheets

(51) Int. Cl.
  *G06F 3/0482*  (2013.01)
  *G06F 3/0488*  (2013.01)
  *G06F 3/023*   (2006.01)
  *G06F 3/0486*  (2013.01)

(52) U.S. Cl.
  CPC .......... *G06F 3/0484* (2013.01); *G06F 3/0486* (2013.01); *G06F 3/04842* (2013.01); *G06F 3/04883* (2013.01); *G06F 3/04886* (2013.01); *G06F 9/543* (2013.01); *G06F 2203/04803* (2013.01)

(56) References Cited

U.S. PATENT DOCUMENTS

| | | | |
|---|---|---|---|
| 6,591,295 B1* | 7/2003 | Diamond | G06F 16/40 |
| | | | 709/217 |
| 8,171,390 B1 | 5/2012 | Channakeshava | |
| 8,873,858 B2 | 10/2014 | Yuan | |
| 9,032,319 B1 | 5/2015 | Hammack et al. | |
| 9,275,077 B2 | 3/2016 | Lee et al. | |
| 9,477,343 B2 | 10/2016 | Park et al. | |
| 9,684,627 B1* | 6/2017 | Sar | G06Q 10/0631 |
| 2003/0014382 A1* | 1/2003 | Iwamoto | G06F 9/543 |
| 2006/0069785 A1 | 3/2006 | Barrett | |
| 2006/0075353 A1 | 4/2006 | Despain et al. | |
| 2006/0190831 A1* | 8/2006 | Kelso | G06F 3/0481 |
| | | | 715/764 |
| 2008/0002888 A1* | 1/2008 | Yuan | G06F 3/0488 |
| | | | 382/187 |
| 2011/0148787 A1 | 6/2011 | Kim | |
| 2011/0197155 A1* | 8/2011 | Lee | G06F 1/1616 |
| | | | 715/770 |
| 2012/0246594 A1 | 9/2012 | Han et al. | |
| 2013/0225236 A1 | 8/2013 | Lee et al. | |
| 2013/0318428 A1* | 11/2013 | Son | G06F 17/24 |
| | | | 715/234 |
| 2014/0013258 A1 | 1/2014 | Jang et al. | |
| 2014/0043298 A1 | 2/2014 | Park et al. | |
| 2014/0333632 A1 | 11/2014 | Kim | |
| 2015/0046831 A1 | 2/2015 | Liang et al. | |
| 2015/0324086 A1* | 11/2015 | Sakamoto | G06F 3/0488 |
| | | | 345/173 |
| 2016/0062613 A1 | 3/2016 | Lee | |
| 2016/0117489 A1* | 4/2016 | Furuichi | G06F 16/955 |
| | | | 726/1 |
| 2016/0154686 A1* | 6/2016 | Huang | G06F 3/0488 |
| | | | 715/770 |
| 2016/0179328 A1 | 6/2016 | Yang et al. | |
| 2016/0299680 A1 | 10/2016 | Polyulya et al. | |
| 2017/0068854 A1* | 3/2017 | Markiewicz | G06K 9/00416 |

FOREIGN PATENT DOCUMENTS

| | | |
|---|---|---|
| EP | 2 685 364 A1 | 1/2014 |
| KR | 10-2010-0018242 A | 2/2010 |
| KR | 10-2012-0107356 A | 10/2012 |
| KR | 10-2013-0097486 A | 9/2013 |
| KR | 10-2015-0116554 A | 10/2015 |
| KR | 10-2016-0076857 A | 7/2016 |
| WO | 2008-001203 A2 | 1/2008 |
| WO | 2015-105271 A1 | 7/2015 |

OTHER PUBLICATIONS

European Search Report dated Sep. 26, 2019, issued in European Application No. 17841675.6-1221 / 3455712.

* cited by examiner

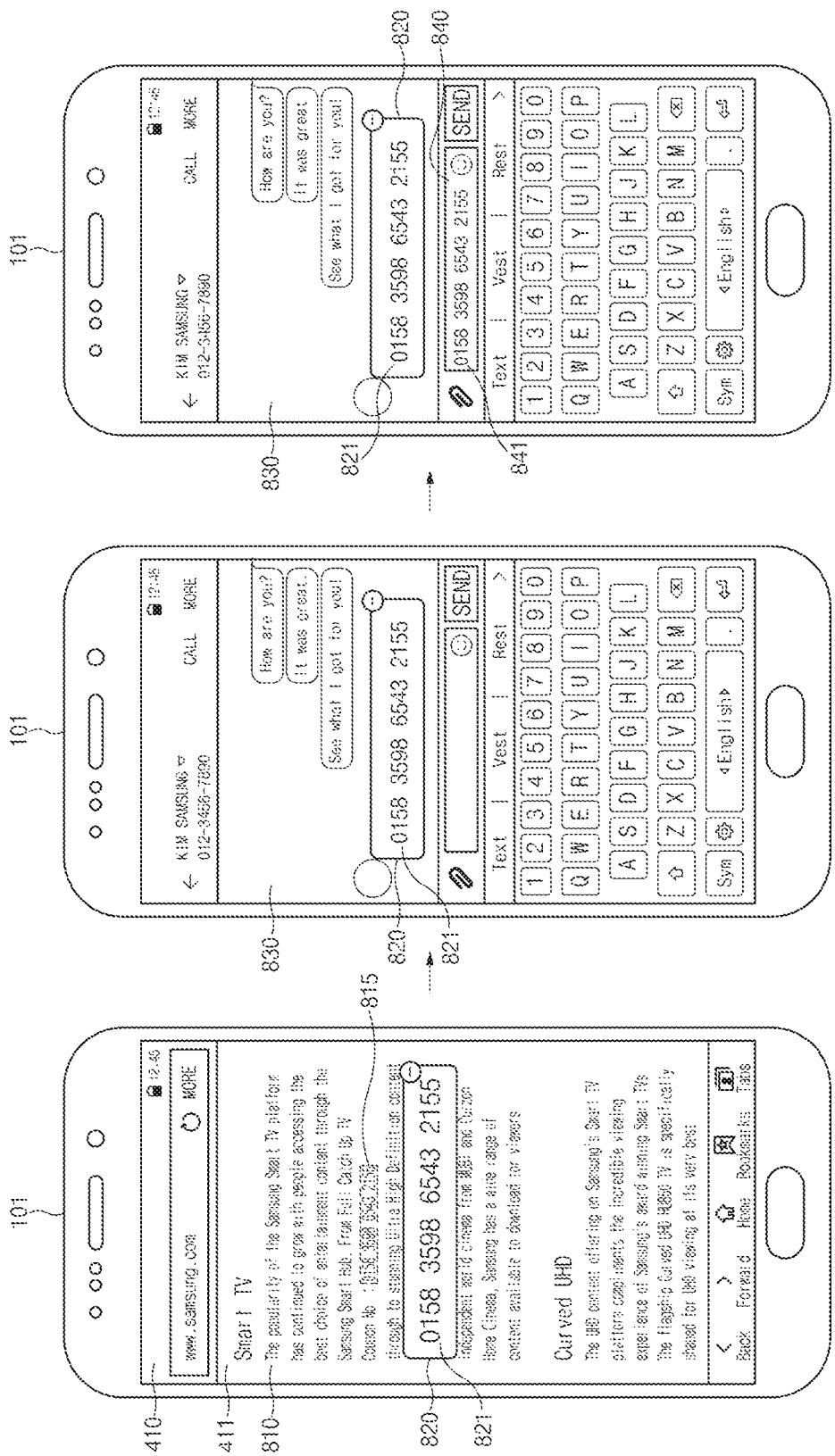

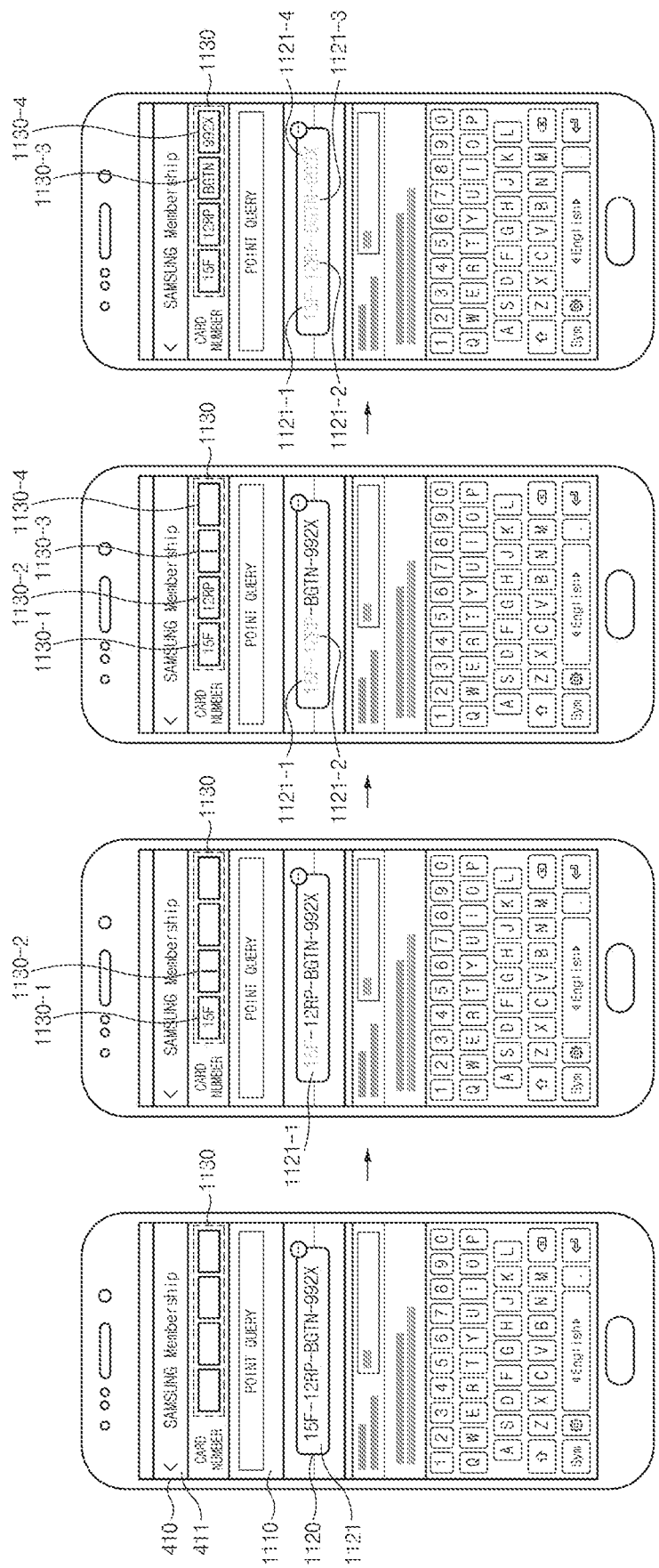

CONTROL METHOD FOR SELECTING AND PASTING CONTENT

CROSS-REFERENCE TO RELATED APPLICATION(S)

This application claims the benefit under 35 U.S.C. § 119(a) of a Korean patent application filed on Aug. 18, 2016 in the Korean Intellectual Property Office and assigned Serial number 10-2016-0104602, the entire disclosure of which is hereby incorporated by reference.

TECHNICAL FIELD

The present disclosure relates to a clip board function of selecting a partial region of displayed content and pasting the selected region into another region in an electronic device.

BACKGROUND

Recently, with the development of digital technologies, various portable electronic devices, such as mobile communication terminals, electronic notes, smartphones, tablet personal computers (PCs), and wearable devices, which may perform communication and may process personal information during their movement, have come to the market. Such portable electronic devices may have a variety of functions, such as a video call function, an electronic note function, a text function, an electronic mail (e-mail) function, and an Internet function, as well as a voice call function and a short message sending function, through rapid technology development.

A portable electronic device may support a clipboard function of copying and pasting data. Users may easily collect and share information using the clipboard function, for example, may execute webpages and may verify information in their portable electronic devices and may copy only necessary regions and may collect the copied regions in other places or may share the copied regions with others.

If using the above-mentioned clipboard function, it is difficult for the user to verify whether desired details are correctly copied until copied details are pasted into another place.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for easily pasting or using copied details by allowing a user to verify details selected and copied by him or her and a control method therefor.

In accordance with an aspect of the present disclosure, an electronic device is provided. The electronic device may include a display, a memory, and a processor electrically connected with the display and the memory and configured to display first content on a first screen region of the display, receive a first user input associated with copying at least part of the first content, obtain at least a partial screen region of the first content as a copy region in response to the first user input, display at least part of data corresponding to the copy region as second content on the display, and maintain a state where a second screen region which displays the second content is displayed while the first content is changed to another content.

In accordance with another aspect of the present disclosure, the processor may be configured to receive a second user input and move the second screen region to a location corresponding to the second user input on a display region of the display.

In accordance with another aspect of the present disclosure, the display may display an input window, and the processor may be configured to enter the at least part of the data corresponding to the copy region in the input window if a second user input signal is received on the second screen region.

In accordance with another aspect of the present disclosure, the display may display an input window, and the processor may be configured to move the second screen region in response to a second user input signal and enter the at least part of the data of the copy data in the input window if a region where the moved second screen region is overlapped with the input window is greater than or equal to a size.

In accordance with another aspect of the present disclosure, the display may display an input window, and the processor may be configured to compare details entered in the input window with at least part of details of the second content and change a state where the at least part of the same details of the second content as the details entered in the input window is displayed.

In accordance with another aspect of the present disclosure, the processor may be configured to change at least one of a luminance, a color, or a saturation of the at least part of the same details of the second content as the details entered in the input window or fail to display the at least part of the same details of the second content as the details entered in the input window.

In accordance with another aspect of the present disclosure, the processor may be configured to end the displaying of the second content if a time elapses after the second content is displayed.

In accordance with another aspect of the present disclosure, the processor may be configured to initialize progress of the time if a second user input signal is received on the second screen region before the displaying of the second content is ended.

In accordance with another aspect of the present disclosure, the processor may be configured to display the entire text as the second content if the number of letters configuring the text is less than a number of letters if the second content is text and display the number of letters in the text as the second content if the number of the letters configuring the text is greater than or equal to the number of letters.

In accordance with another aspect of the present disclosure, the processor may be configured to, if the second content is an image, display the image as the second content if a display size of the image is less than a value and display a reduction image in which the image is reduced to a size or a thumbnail image associated with the image as the second content if the display size of the image is greater than or equal to the value.

In accordance with another aspect of the present disclosure, a method for controlling an electronic device including a display is provided. The method may include displaying first content on a first screen region of the display, receiving a first user input associated with copying at least part of the first content, obtaining at least a partial region of the first content as a copy region in response to the first user input, displaying at least part of data corresponding to the copy region as second content on the display, and maintaining a state where a second screen region which displays the second content is displayed while the first content is changed to another content.

In accordance with another aspect of the present disclosure, the method may further include receiving a second user input and moving the second screen region to a location corresponding to the second user input on a display region of the display.

In accordance with another aspect of the present disclosure, the method may further include displaying an input window on the display, receiving a second user input signal on the second screen region, and entering the at least part of the data corresponding to the copy region in the input window in response to the second user input.

In accordance with another aspect of the present disclosure, the method may further include displaying an input window on the display, comparing details entered in the input window with at least part of details of the second content, and changing a state where the at least part of the same details of the second content as the details entered in the input window is displayed.

In accordance with another aspect of the present disclosure, the changing of the state may include changing at least one of a luminance, a color, or a saturation of the at least part of the same details of the second content as the details entered in the input window or failing to display the at least part of the same details of the second content as the details entered in the input window.

In accordance with another aspect of the present disclosure, the maintaining of the state where the second screen region which displays the second content is displayed while the first content is changed to the other content may further include, if a time elapses, ending the displaying of the second content.

In accordance with another aspect of the present disclosure, the ending of the displaying of the second content if the time elapses may include, if a second user input signal is received on the second screen region before the displaying of the second content is ended, initializing progress of the time.

In accordance with another aspect of the present disclosure, the method may further include, if the second content is text, displaying the entire text as the second content if the number of letters configuring the text is less than a number of letters and displaying the number of letters in the text as the second content if the number of the letters configuring the text is greater than or equal to the number of letters.

In accordance with another aspect of the present disclosure, the method may further include, if the second content is an image, displaying the image as the second content if a display size of the image is less than a value and displaying a reduction image in which the image is reduced to a size or a thumbnail image associated with the image as the second content if the display size of the image is greater than or equal to the value.

In accordance with an aspect of the present disclosure, a non-transitory storage medium is provided. The non-transitory storage medium storing embodied thereon a program for executing a method for controlling an electronic device including a display, the non-transitory storage medium storing at least one execution code to display first content on a first screen region of the display, receive a user input associated with copying at least part of the first content, obtain at least a partial region of the first content as a copy region in response to the user input, display at least part of data corresponding to the copy region as second content on the display, and maintain a state where a second screen region which displays the second content is displayed while the first content is changed to another content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A, 8B, and 8C are drawings illustrating a situation where the displaying of second content is maintained although first content is changed in an electronic device according to various embodiments of the present disclosure;

FIGS. 11A, 11B, 11C, and 11D are drawings illustrating a situation where a second region disappears in stages in an electronic device according to various embodiments.

Throughout the drawings, it should be noted that like reference numbers are used to depict the same or similar elements, features, and structures.

DETAILED DESCRIPTION

Figure 1:
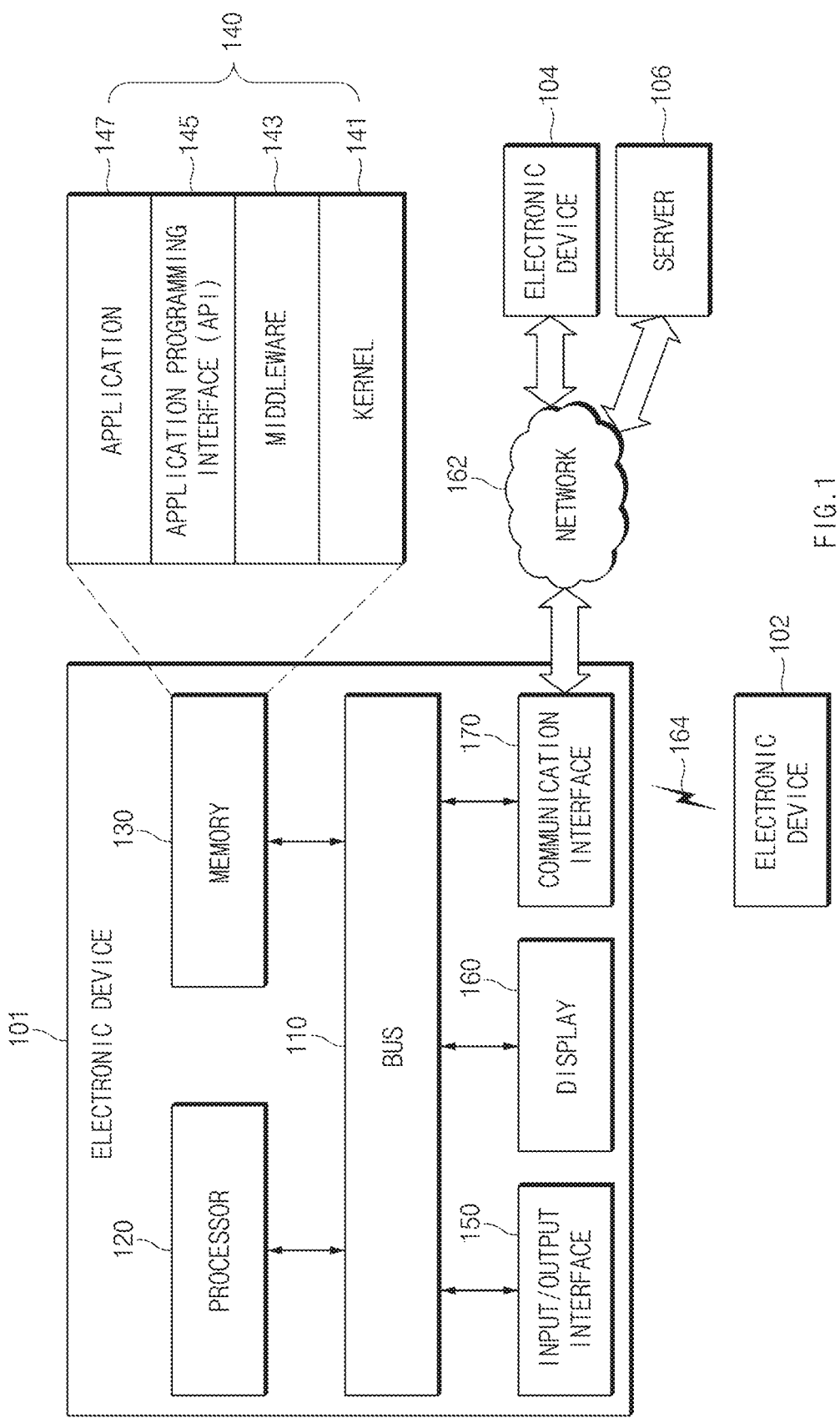
FIG. 1 is a block diagram illustrating a configuration of an electronic device in a network environment according to various embodiments of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following disclosure, the expressions "have," "may have," "include," and "comprise," or "may include" and "may comprise" used herein indicate the existence of corresponding features (e.g., elements such as numeric values, functions, operations, or components) but do not exclude the presence of additional features.

In the following disclosure, the expressions "A or B," "at least one of A or/and B," or "one or more of A or/and B." and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. A central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Moving Picture Experts Group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a block diagram illustrating a configuration of an electronic device in a network environment according to various embodiments of the present disclosure.

Referring to FIG. 1, in various embodiments, an electronic device 101 and a first external electronic device 102, a second external electronic device 104, or a server 106 may connect with each other through a network 162 or a local-area communication 164. The electronic device 101 may include a bus 110, a processor 120, a memory 130, an input and output interface 150, a display 160, and a communication interface 170. In various embodiments, at least one of the components may be omitted from the electronic device 101, or other components may be additionally included in the electronic device 101.

The bus 110 may be, for example, a circuit which connects the components 120 to 170 with each other and transmits a communication signal (e.g., a control message and/or data) between the components.

The processor 120 may include one or more of a CPU, an AP, or a communication processor (CP). For example, the processor 120 may perform calculation or data processing about control and/or communication of at least another of the components of the electronic device 101.

The memory 130 may include a volatile and/or non-volatile memory. The memory 130 may store, for example, a command or data associated with at least another of the components of the electronic device 101. According to an embodiment, the memory 130 may store software and/or a program 140. The program 140 may include, for example, a kernel 141, a middleware 143, an application programming interface (API) 145, and/or an least one application program 147 (or "at least one application"), and the like. At least part of the kernel 141, the middleware 143, or the API 145 may be referred to as an operating system (OS).

The kernel 141 may control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 may provide an interface which may control or manage system resources.

The middleware 143 may play a role as, for example, a go-between such that the API 145 or the application program 147 communicates with the kernel 141 to communicate data.

Also, the middleware 143 may process one or more work requests, received from the application program 147, in order of priority. For example, the middleware 143 may assign priority which may use system resources (the bus 110, the processor 120, or the memory 130, and the like) of the electronic device 101 to at least one of the at least one application program 147. For example, the middleware 143 may perform scheduling or load balancing for the one or more work requests by processing the one or more work requests in order of the priority assigned to the at least one of the at least one application program 147.

The API 145 may be, for example, an interface in which the application program 147 controls a function provided from the kernel 141 or the middleware 143. For example, the API 145 may include at least one interface or function (e.g., a command) for file control, window control, image processing, or text control, and the like.

The input and output interface 150 may play a role as, for example, an interface which may transmit a command or data input from a user or another external device to another component (or other components) of the electronic device 101. Also, the input and output interface 150 may output an instruction or data received from another component (or other components) of the electronic device 101 to the user or the other external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, a variety of content (e.g., text, images, videos, icons, or symbols, and the like) to the user. The display 160 may include a touch screen, and may receive, for example, touch, gesture, proximity, or a hovering input using an electronic pen or part of a body of the user.

The communication interface 170 may establish communication between, for example, the electronic device 101 and an external device (e.g., the first external electronic device 102, the second external electronic device 104, or the server 106). For example, the communication interface 170 may connect to the network 162 through wireless communication or wired communication and may communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, the local-area communication 164. The local-area communication 164 may include, for example, at least one of wireless-fidelity (Wi-Fi) communication, Bluetooth (BT) communication, near field communication (NFC), or global navigation satellite system (GNSS) communication, and the like.

A magnetic stripe transmission (MST) module may generate a pulse based on transmission data using an electromagnetic signal and may generate a magnetic field signal based on the pulse. The electronic device 101 may output the magnetic field signal to a point of sales (POS) system. The POS system may restore the data by detecting the magnetic field signal using an MST reader and converting the detected magnetic field signal into an electric signal.

The GNSS may include, for example, at least one of a GPS, a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 162 may include a telecommunications network, for example, at least one of a computer network (e.g., a local area network (LAN) or a wide area network (WAN)), the Internet, or a telephone network.

Each of the first and second external electronic devices 102 and 104 may be the same as or different device from the electronic device 101. According to an embodiment, the server 106 may include a group of one or more servers. According to various embodiments, all or some of operations executed in the electronic device 101 may be executed in another electronic device or a plurality of electronic devices (e.g., the first external electronic device 102, the second external electronic device 104, or the server 106). According to an embodiment, if the electronic device 101 should perform any function or service automatically or according to a request, it may request another device (e.g., the first external electronic device 102, the second external electronic device 104, or the server 106) to perform at least part of the function or service, rather than executing the function or service for itself or in addition to the function or service. The other electronic device (e.g., the first external electronic device 102, the second external electronic device 104, or the server 106) may execute the requested function or the added function and may transmit the executed result to the electronic device 101. The electronic device 101 may process the received result without change or additionally and may provide the requested function or service. For this purpose, for example, cloud computing technologies, distributed computing technologies, or client-server computing technologies may be used.

Figure 2:
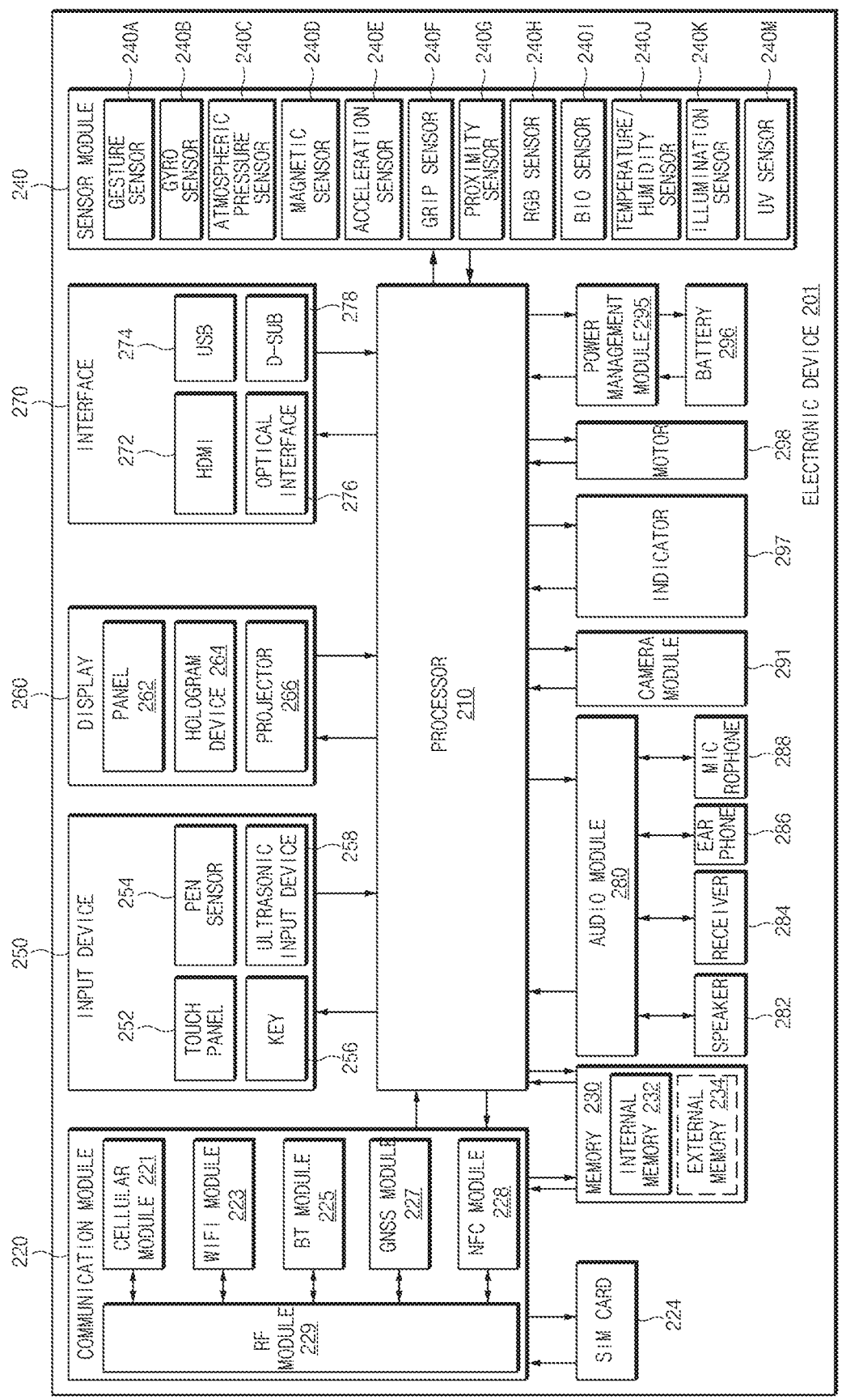
FIG. 2 is a block diagram illustrating a configuration of an electronic device according to various embodiments of the present disclosure.

FIG. 2 is a block diagram illustrating a configuration of an electronic device according to various embodiments of the present disclosure.

Referring to FIG. 2, the electronic device 201 may include, for example, all or part of an electronic device 101 shown in FIG. 1. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an OS or an application program to control a plurality of hardware or software components connected thereto and may process and compute a variety of data. The processor 210 may be implemented with, for example, a system on chip (SoC). According to an embodiment, the processor 210 may include a graphic processing unit (GPU) (not shown) and/or an image signal processor (ISP) (not shown). The processor 210 may include at least some (e.g., a cellular module 221) of the components shown in FIG. 2. The processor 210 may load a command or data received from at least one of other components (e.g., a non-volatile memory) into a volatile memory to process the data and may store various data in a non-volatile memory.

The communication module 220 may have the same or similar configuration to a communication interface 170 of FIG. 1. The communication module 220 may include, for example, the cellular module 221, a Wi-Fi module 223, a BT module 225, a GNSS module 227 (e.g., a GPS module, a Glonass module, a Beidou module, or a Galileo module), an NFC module 228, an MST module, and a radio frequency (RF) module 229.

The cellular module 221 may provide, for example, a voice call service, a video call service, a text message service, or an Internet service, and the like through a communication network. According to an embodiment, the cellular module 221 may identify and authenticate the electronic device 201 in a communication network using the SIM 224 (e.g., a SIM card). According to an embodiment, the cellular module 221 may perform at least part of functions which may be provided by the processor 210. According to an embodiment, the cellular module 221 may include a CP.

The Wi-Fi module 223, the BT module 225, the GNSS module 227, the NFC module 228, or the MST module may include, for example, a processor for processing data transmitted and received through the corresponding module. According to various embodiments, at least some (e.g., two or more) of the cellular module 221, the Wi-Fi module 223, the BT module 225, the GNSS module 227, the NFC module 228, or the MST module may be included in one integrated chip (IC) or one IC package.

The RF module 229 may transmit and receive, for example, a communication signal (e.g., an RF signal). Though not shown, the RF module 229 may include, for example, a transceiver, a power amplifier module (PAM), a frequency filter, or a low noise amplifier (LNA), or an antenna, and the like. According to another embodiment, at least one of the cellular module 221, the Wi-Fi module 223, the BT module 225, the GNSS module 227, the NFC module 228, or the MST module may transmit and receive an RF signal through a separate RF module.

The SIM 224 may include, for example, a card which includes a SIM and/or an embedded SIM. The SIM 224 may include unique identification information (e.g., an integrated circuit card identifier (ICCID)) or subscriber information (e.g., an international mobile subscriber identity (IMSI)).

The memory 230 (e.g., a memory 130 of FIG. 1) may include, for example, an embedded memory 232 or an external memory 234. The embedded memory 232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 234 may include a flash drive, for example, a compact flash (CF), a secure digital (SD), a micro-SD, a mini-SD, an extreme digital (xD), a multimedia card (MMC), or a memory stick, and the like. The external memory 234 may operatively and/or physically connect with the electronic device 201 through various interfaces.

The sensor module 240 may measure, for example, a physical quantity or may detect an operation state of the electronic device 201, and may convert the measured or detected information to an electric signal. The sensor module 240 may include at least one of, for example, a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illumination sensor 240K, or an ultraviolet (UV) sensor 240M. Additionally or alternatively, the sensor module 240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 240 may further include a control circuit for controlling at least one or more sensors included therein. According to various embodiments, the electronic device 201 may further include a processor configured to control the sensor module 240, as part of the processor 210 or to be independent of the processor 210. While the processor 210 is in a sleep state, the electronic device 201 may control the sensor module 240.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, or an ultrasonic type. Also, the touch panel 252 may further include a control circuit. The touch panel 252 may further include a tactile layer and may provide a tactile reaction to a user.

The (digital) pen sensor 254 may be, for example, part of the touch panel 252 or may include a separate sheet for recognition. The key 256 may include, for example, a physical button, an optical key, or a keypad. The ultrasonic input device 258 may allow the electronic device 201 to detect a sound wave using a microphone (e.g., a microphone 288) and to verify data through an input tool generating an ultrasonic signal.

The display 260 (e.g., a display 160 of FIG. 1) may include a panel 262, a hologram device 264, or a projector 266. The panel 262 may include the same or similar configuration to the display 160. The panel 262 may be implemented to be, for example, flexible, transparent, or wearable. The panel 262 and the touch panel 252 may be integrated into one module. The hologram device 264 may show a stereoscopic image in a space using interference of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, an HDMI 272, a USB 274, an optical interface 276, or a D-subminiature 278. The interface 270 may be included in, for example, a communication interface 170 shown in FIG. 1. Additionally or alternatively, the interface 270 may include, for example, a mobile high definition link (MHL) interface, an SD card/MMC interface, or an infrared data association (IrDA) standard interface.

The audio module 280 may convert a sound and an electric signal in dual directions. At least part of components of the audio module 280 may be included in, for example, an input and output interface 150 (or a user interface (UI)) shown in FIG. 1. The audio module 280 may process sound information input or output through, for example, a speaker 282, a receiver 284, an earphone 286, or the microphone 288, and the like.

The camera module 291 may be a device which captures a still image and a moving image. According to an embodiment, the camera module 291 may include one or more image sensors (not shown) (e.g., a front sensor or a rear sensor), a lens (not shown), an ISP (not shown), or a flash (not shown) (e.g., an LED or a xenon lamp).

The power management module 295 may manage, for example, power of the electronic device 201. According to an embodiment, though not shown, the power management module 295 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 296 and voltage, current, or temperature thereof while the battery 296 is charged. The battery 296 may include, for example, a rechargeable battery or a solar battery.

The indicator 297 may display a specific state of the electronic device 201 or part (e.g., the processor 210) thereof, for example, a booting state, a message state, a charging state, and the like. The motor 298 may convert an electric signal into mechanical vibration and may generate vibration or a haptic effect, and the like. Though not shown, the electronic device 201 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 3:
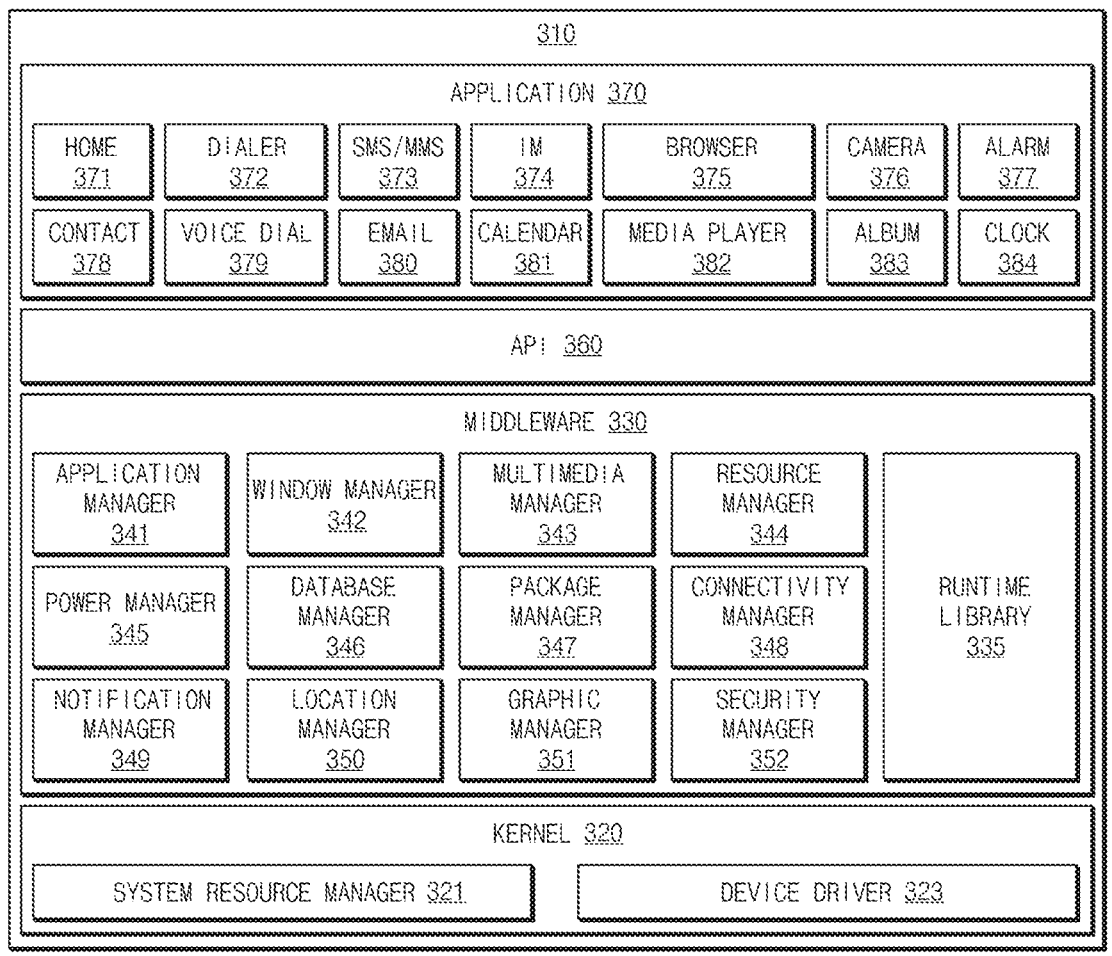
FIG. 3 is a block diagram illustrating a configuration of a program module according to various embodiments of the present disclosure.

FIG. 3 is a block diagram illustrating a configuration of a program module according to various embodiments of the present disclosure.

Referring to FIG. 3, according to an embodiment, a program module 310 (e.g., the program 140 of FIG. 1) may include an OS to control resources associated with an electronic device (e.g., an electronic device 101 of FIG. 1), and/or various applications (e.g., an application program 147 of FIG. 1) driven on the OS. The OS may include, for example, Android™, iOS™, Windows™, Symbian™, Tizen™, or Bada™ Referring to FIG. 3, the program module 310 may include a kernel 320 (e.g., the kernel 141 of FIG. 1), a middleware 330 (e.g., the middleware 143 of FIG. 1), an API 360 (e.g., the API 145), and/or an application 370 (e.g., the application 147 of FIG. 1). At least part of the program module 310 may be preloaded on an electronic device or may be downloadable from an external electronic device (e.g., a first electronic device 102, a second electronic device 104, a server 106, or the like of FIG. 1).

The kernel 320 (e.g., the kernel 141 of FIG. 1) may include, for example, a system resource manager 321 and/or a device driver 323. The system resource manager 321 may control, assign, or collect, and the like system resources. According to an embodiment, the system resource manager 321 may include a process management unit, a memory management unit, or a file system management unit, and the like. The device driver 323 may include, for example, a display driver, a camera driver, a BT driver, a shared memory driver, a USB driver, a keypad driver, a Wi-Fi driver, an audio driver, or an inter-process communication (IPC) driver.

The middleware 330 (e.g., the middleware 143 of FIG. 1) may provide, for example, functions the application 370 needs in common, and may provide various functions to the application 370 through the API 360 such that the application 370 efficiently uses limited system resources in the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager.

The runtime library 335 may include, for example, a library module used by a compiler to add a new function through a programming language while the application 370 is executed. The runtime library 335 may perform a function about input and output management, memory management, or an arithmetic function.

The application manager 341 may manage, for example, a life cycle of at least one of the application 370. The window manager 342 may manage graphic user interface (GUI) resources used on a screen of the electronic device. The multimedia manager 343 may determine a format utilized for reproducing various media files and may encode or decode a media file using a codec corresponding to the corresponding format. The resource manager 344 may manage source codes of at least one of the application 370, and may manage resources of a memory or a storage space, and the like.

The power manager 345 may act together with, for example, a basic input/output system (BIOS) and the like, may manage a battery or a power source, and may provide power information utilized for an operation of the electronic device. The database manager 346 may generate, search, or change a database to be used in at least one of the application 370. The package manager 347 may manage installation or update of an application distributed by a type of a package file.

The connectivity manager 348 may manage, for example, a wireless connection such as a Wi-Fi connection, a BT connection, and the like. The notification manager 349 may display or notify events, such as an arrival message, an appointment, and proximity notification, by a method which is not disturbed to the user. The location manager 350 may manage location information of the electronic device. The graphic manager 351 may manage a graphic effect to be provided to the user or a UI related to the graphic effect. The security manager 352 may provide all security functions utilized for system security or user authentication, and the like. According to an embodiment, when the electronic device (e.g., an electronic device 101 of FIG. 1) has a phone function, the middleware 330 may further include a telephony manager (not shown) for managing a voice or video communication function of the electronic device.

The middleware 330 may include a middleware module which configures combinations of various functions of the above-described components. The middleware 330 may provide a module which specializes according to kinds of OSs to provide a differentiated function. Also, the middleware 330 may dynamically delete some of old components or may add new components.

The API 360 (e.g., the API 145 of FIG. 1) may be, for example, a set of API programming functions, and may be provided with different components according to OSs. For example, in case of Android or iOS, one API set may be provided according to platforms. In case of Tizen, two or more API sets may be provided according to platforms.

The application 370 (e.g., the application program 147 of FIG. 1) may include one or more of, for example, a home application 371, a dialer application 372, a short message service (SMS)/multimedia messaging service (MMS) application 373, an instant message (WI) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 370 may include an application (hereinafter, for better understanding and ease of description, referred to as "information exchange application") for exchanging information between the electronic device (e.g., the electronic device 101 of FIG. 1) and an external electronic device (e.g., the first external electronic device 102 or the second external electronic device 104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 102 or the second external electronic device 104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 102 or the second external electronic device 104) which communicates with the electronic device, an application which operates in the external electronic device, or a service (e.g., a call service or a message service) provided from the external electronic device.

According to an embodiment, the application 370 may include an application (e.g., the health card application of a mobile medical device) which is preset according to attributes of the external electronic device (e.g., the first external electronic device 102 or the second external electronic device 104). According to an embodiment, the application 370 may include an application received from the external electronic device (e.g., the server 106, the first external electronic device 102, or the second external electronic device 104). According to an embodiment, the application 370 may include a preloaded application or a third party application which may be downloaded from a server. Names of the components of the program module 310 according to various embodiments of the present disclosure may differ according to kinds of OSs.

According to various embodiments, at least part of the program module 310 may be implemented with software, firmware, hardware, or at least two or more combinations thereof. At least part of the program module 310 may be implemented (e.g., executed) by, for example, a processor (e.g., a processor 120 of FIG. 1). At least part of the program module 310 may include, for example, a module, a program, a routine, sets of instructions, or a process, and the like for performing one or more functions.

Figure 4:
FIG. 4 is a block diagram illustrating a schematic configuration of an electronic device according to various embodiments of the present disclosure.

FIG. 4 is a block diagram illustrating a schematic configuration of an electronic device according to various embodiments of the present disclosure.

Referring to FIG. 4, an electronic device 101 of FIG. 1 may include a display 410, a processor 420, and a memory 430. Since the elements shown in FIG. 4 are not essential, the electronic device 101 according to various embodiments may be implemented to have more or fewer elements than those shown in FIG. 4. For example, the electronic device 101 may be configured to include an element such as an input module (e.g., a touch panel, a hard key, a proximity sensor, a biometric sensor, or the like) or a power supply unit.

According to various embodiments, the display 410 may be of a form of a touch screen. The display 410 of FIG. 4 may refer to the display 160 of FIG. 1 or the display 260 of FIG. 2. The display 410 may receive, for example, a touch, a gesture, proximity, or a hovering input using an electronic pen or part of a user's body. The display 410 may display a variety of content (e.g., a webpage, a screen where an application is executed, or the like) based on control of the processor 420.

According to various embodiments, if the display 410 is of a form of the touch screen, the display 410 may receive a user input for selecting at least part of a variety of displayed content. A user may touch, for example, at least part of content displayed on the display 410 to select the at least part of the content.

Further, the user may touch one region and another region of the display 410, which display content, to select all of content between the one region and the other region. However, the method of allowing the user to selecting the at least part of the content is not limited thereto. For example, the user may select content using a physical key and the like mounted on the electronic device 101.

According to various embodiments, the display 410 may be divided into a first region (or first screen region) and a second region (or second screen region) to display different content. The first region and the second region may be regions divided on one display and may be regions overlapped with each other. Further, if the electronic device 101 includes a plurality of displays, the first region may be one of the plurality of displays, and the second region may be another of the plurality of displays.

The processor 420 may refer to the processor 120 of FIG. 1 or the processor 210 of FIG. 2. The processor 420 may control various elements of the electronic device 101. According to various embodiments, the processor 420 may display the above-mentioned content on the display 410.

For example, the processor 420 may display first content on the first region of the display 410. If a signal for selecting and copying at least a partial region of the first content is received, the processor 420 may copy content corresponding to the selected region and may display the copied content as second content on the second region overlapped with the first region.

For example, the processor 420 may copy data (e.g., at least one of text and multimedia data) corresponding to the selected region in response to the signal for selecting and copying the at least partial region of the first content and may generate the copied data as clip data (or convert the copied data into the clip data), thus storing the clip data in the memory 430. The clip data may refer to data in which a region selected by a signal input from the outside in the at least partial region of the first content is copied.

According to various embodiments, when generating the clip data, the processor 420 may convert at least part of the selected content based on a web language such as a hypertext markup language (HTML) and an extensible markup language (XML) (or into a format of the web language). When generating the clip data, the processor 420 may generate second content using typical data or capture data corresponding to the clip data.

Meanwhile, although the first content displayed on the first region is changed to another content, the processor 420 may maintain the displaying of the second content on the second region.

The memory 430 may refer to the memory 130 of FIG. 1 or the memory 230 of FIG. 2. The memory 430 may store instructions or data associated with at least another of the elements of the electronic device 101.

For example, the memory 430 may store data corresponding to content to be displayed on the display 410. The processor 420 may read data stored in the memory 430 and may display the read data on the display 410 in the form of an image.

According to various embodiments, the memory 430 may store a region selected and copied by the user in at least a partial region of the first content displayed on the display 410 as clip data.

Figures 5A, 5B:
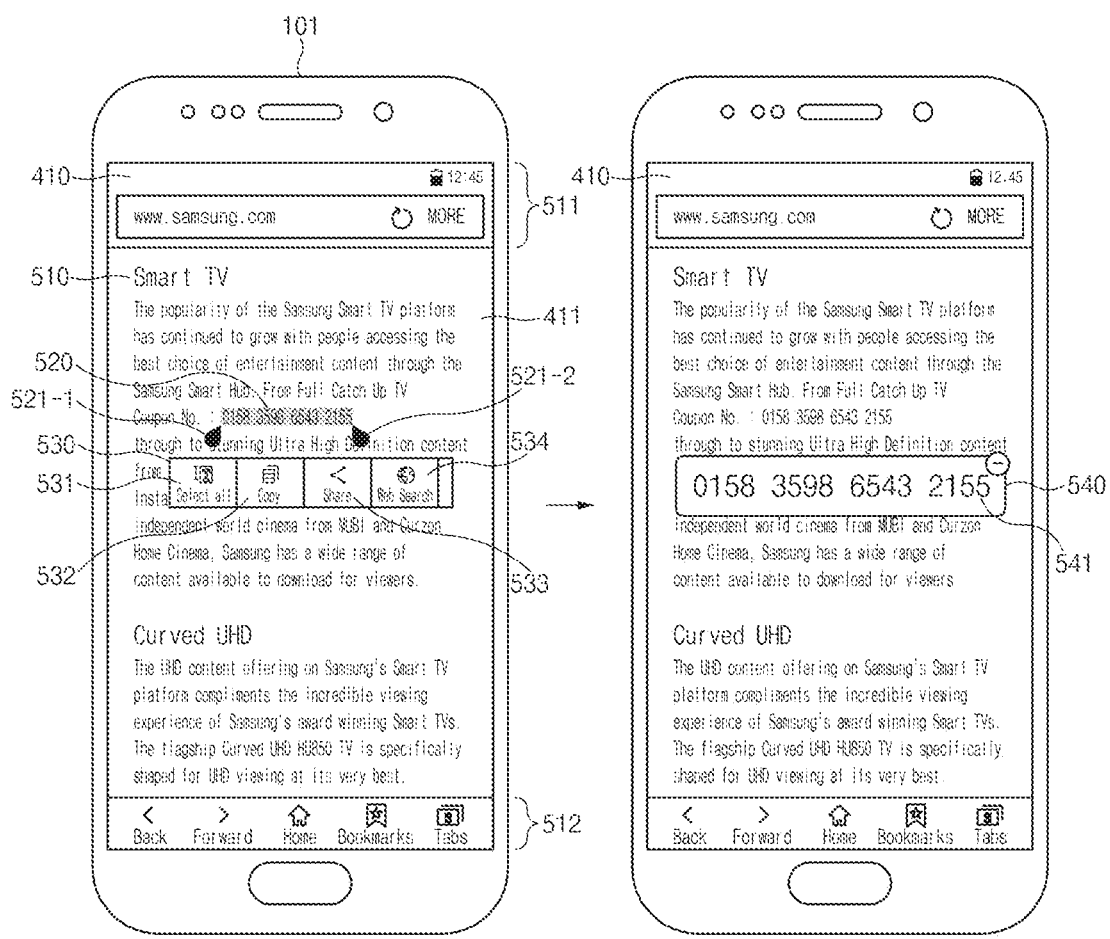
FIGS. 5A and 5B are drawings illustrating a situation of selecting and displaying a partial region of content displayed on a display in an electronic device according to various embodiments of the present disclosure.

FIGS. 5A and 5B are drawings illustrating a situation of selecting and displaying a partial region of content displayed on a display in an electronic device according to various embodiments of the present disclosure.

Referring to FIG. 5A, the electronic device 101 (or the processor 120 or 420 of the electronic device 101) may display first content (e.g., a webpage 510) on a first region 411 of the display 410. An address of the webpage 510 may be displayed on an upper end 511 of the webpage 510. Function icons associated with a page (e.g., a function icon associated with moving to another webpage and a function icon for displaying a previously stored webpage) may be displayed on a lower end 512 of the webpage 510. An article may be displayed between the upper end 511 and the lower end 512 of the webpage 510.

According to various embodiments, the electronic device 101 may receive a signal for selecting a partial region of displayed content (e.g., a signal corresponding to a user input). For example, a user may select a partial region of content displayed on the display 410 using a touch or a physical key.

In more detail, the user may select a partial region 520 among characters displayed on the webpage 510. The electronic device 101 may display the selected partial region 520 to differ from a previous state. For example, the electronic device 101 may display a character color of the selected partial region 520 in a different way or may display a background color of a character of the selected partial region 520 in a different way, in response to a user input.

According to various embodiments, the electronic device 101 may display UI elements 521-1 and 521-2 for adjusting a range corresponding to the selected partial region 520. The user may adjust the range corresponding to the selected partial region 520 while moving the UI elements 521-1 and 521-2.

If a partial region of content displayed on the display 410 is selected, the electronic device 101 may display function icons 530 for executing a function. For example, the electronic device 101 may display an icon 531 for expanding a selected region to all of content, an icon 532 for copying the selected region, an icon 533 associated with a function of sharing the selected region, an icon 534 for searching a web server for information associated with the selected region, and the like. Examples of the present disclosure are not limited to the above-mentioned examples. For example, the electronic device 101 may further display function icons for executing another function other than the above-mentioned function icons.

Referring to FIG. 5B, if the icon 532 for copying the selected region is selected, the electronic device 101 may generate clip data by copying the selected region 520 and may generate second content 541 corresponding to the clip data, thus displaying the generated second content 541 on a second region 540 of the display 410. At least part of the second region 540 may include, for example, a form of a separate pop-up window. However, examples of the present disclosure are not limited thereto.

As such, the electronic device 101 may separately display a portion selected and copied from the first content on the second region 540 such that the user directly verifies details copied by him or her without performing a separate operation.

According to various embodiments, the second region 540 may move in location based on an external input. For example, the user may touch and drag the second region 540 to freely move the second region 540 within a display region of the display 410. Thus, although the second region 540 hides some of details of the first content 510, the user may verify the hidden details of the first content 510 while freely moving the second region 540. A description will be given of a type of the second region 540 displayed in the form of a pop-up window with reference to FIGS. 7A to 7C.

Figure 6A:
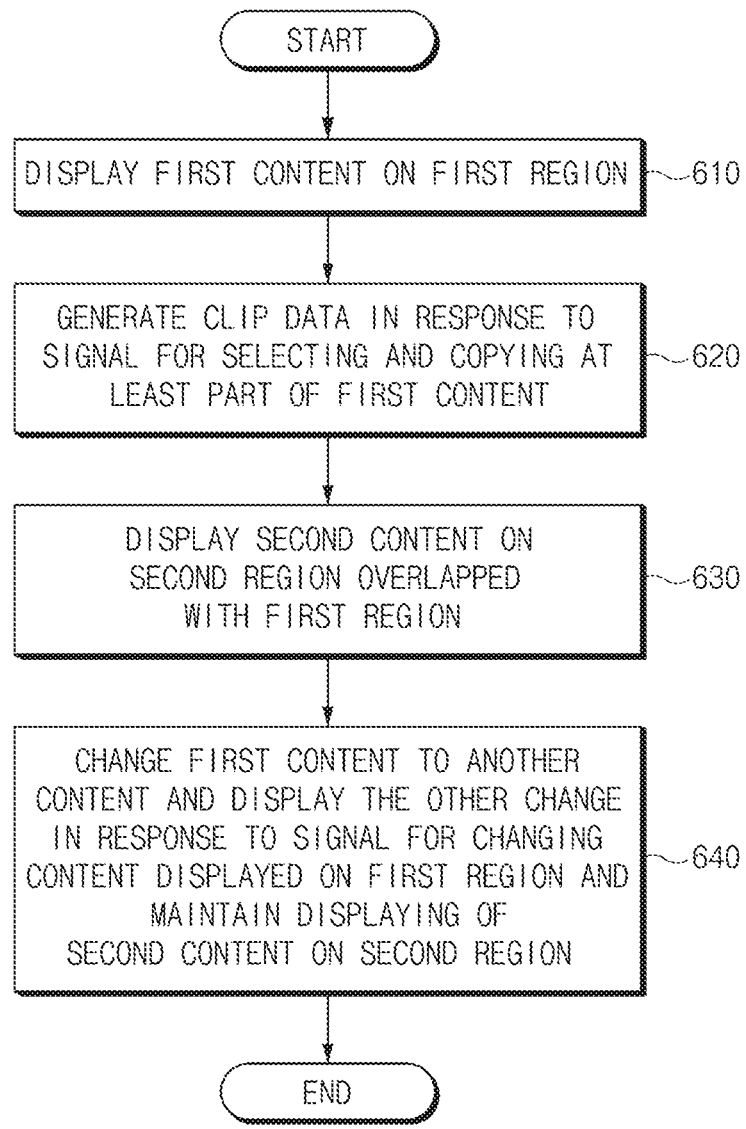
FIG. 6A is a flowchart illustrating a situation of selecting and displaying a partial region of content displayed on a display in an electronic device according to various embodiments of the present disclosure.

FIG. 6A is a flowchart illustrating a situation of selecting and displaying a partial region of content displayed on a display in an electronic device according to various embodiments of the present disclosure.

In operation 610, the electronic device 101 of FIG. 1 (e.g., the processor 120 or 420 of the electronic device 101) may display first content on a first region of the display 410 of FIG. 4. The first region may include, for example, at least a partial region of the entire display region of the display 410 or the entire display region. The first content may include content including at least one of a still image, text, and a moving image. For example, the first content may include at least part of a webpage.

In operation 620, the electronic device 101 may generate clip data in response to receiving a signal for selecting and copying at least a partial region of the first content displayed on the display 410. If the display 410 is of a form of a touch screen, the user may directly touch content displayed on the display 410 to select a region to be copied. Further, if a physical key is mounted on the electronic device 101, the user may select a region to be copied in content displayed on the display 410 through an operation of the physical key.

When executing a copy for generating clip data, the electronic device 101 may generate selected data as a web language such as an HTML, and an XML (or in a format of the web language). The web language may indicate a basic programming language used to generate a web document (e.g., a webpage).

According to various embodiments, when generating and storing a region selected from the first content as clip data, the electronic device 101 may include an instruction (e.g., a tag) which defines a font (e.g., a letter size, a letter color, or a letter shape) of the selected first content, a type (e.g., a still image, a moving image, or sound data) of the selected first content, connection information (e.g., a hyperlink) of the selected first content, and the like.

Thus, if stored clip data is pasted into another data of a specific screen, the pasted clip data may be represented while its original data (i.e., the first content) is maintained in form and/or format. The electronic device 101 may separately store the generated clip data in the memory 430 of FIG. 4.

In operation 630, the electronic device 101 may display second content on a second region overlapped with the first region. At least part of the second region may include, for example, a form of a pop-up window. However, embodiments are not limited thereto. For example, the second region may include the remaining region except for a portion occupied by the first region without being overlapped with the first region on the display 410.

According to various embodiments, the electronic device 101 may use any one of a method of using typical data and a method of generating capture data when generating the second content.

For example, if data of a copied region is text, the electronic device 101 may generate the second content by generating typical data using part or all of the copied data. Further, if copied data includes one or more multimedia data (e.g., a still image, a moving image, and the like), the electronic device 101 may download and store a first still image among the multimedia data and may generate the second content using the stored still image. The electronic device 101 may generate the second content by combining data (e.g., text) of a copied region with a downloaded and stored still image.

Further, the electronic device 101 may generate capture data by automatically capturing a selected region and may generate the second content by storing a capture image in which the generated capture data is converted into an image.

When generating and storing the second content, the electronic device 101 according to various embodiments may store the second content to interwork with the real clip data connected with the second content. For example, meta information and the like for calling real clip data corresponding to the second content may be stored in a header of typical data or capture data which forms the second content.

In more detail, the electronic device 101 may generate the second content by copying an image displayed on a webpage. In this case, the electronic device 101 may generate the copied image itself as the second content and may use a thumbnail image included in the copied image as the second content. If a display size of the copied image is less than a value, the electronic device 101 may generate the copied image itself as the second content. If the display size of copied image is greater than or equal to the value, the electronic device 101 may use the thumbnail image as the second content.

Further, the electronic device 101 may generate the second content by capturing a screen where an image is displayed on a webpage. In this case, since a display size of a capture image where a screen is captured is not generally large, the electronic device 101 may generate the second content using the capture image. However, embodiments are not limited thereto.

In operation 640, the electronic device 101 may change the first content to another content in response to a signal for changing the first content displayed on the first region and may display the changed content. For example, if the display 410 of the electronic device 101 is configured with a touch screen, the user may perform an operation of touching or dragging a region which displays the first content to input a signal for changing the first content to another content. Further, the user may input a signal for changing the first content to another content using a separate physical key.

In more detail, if the electronic device 101 according to various embodiments displays a webpage on the display 410, the user may touch and drag a region which displays the webpage to scroll the webpage.

Further, if the electronic device 101 executes an album application and displays an image, the user may touch and drag a region which displays the image to display other stored images.

According to various embodiments, if the electronic device 101 displays a webpage (e.g., the first content) on the display 410, the user may stop executing the webpage and may execute a dialer application (e.g., another content). In other words, the electronic device 101 may end an application which is currently being executed in response to an external input and may execute another application.

In operation 640, the electronic device 101 may maintain a state where the second content is displayed on the second region. For example, although a state where the first content is displayed is changed to a state where another content is displayed according to a user input, the electronic device 101 may maintain a state where the second content obtained in the state where the first content is displayed is displayed. In other words, the electronic device 101 may maintain the state where the second content is displayed to be independent of a change in the state where the first content is displayed.

For example, the electronic device 101 according to various embodiments may change a first webpage to a second webpage while maintaining a state where at least a partial region copied from the first webpage displayed on the display 410 is displayed.

Alternatively, the electronic device 101 may end a webpage and may output a screen where another application (e.g., a dialer application) is executed, while maintaining a state where at least a partial region copied from the webpage displayed on the display 410 is displayed.

Due to this, the user may use content copied from the webpage for the dialer application. For example, the user may copy a phone number displayed on a webpage and may select the phone number displayed on the display 410 in the form of a pop-up window, thus inputting the selected phone number to the dialer application. Thus, the user may paste copied content into a region he or she wants while continuing verifying copied details.

Figure 6B:
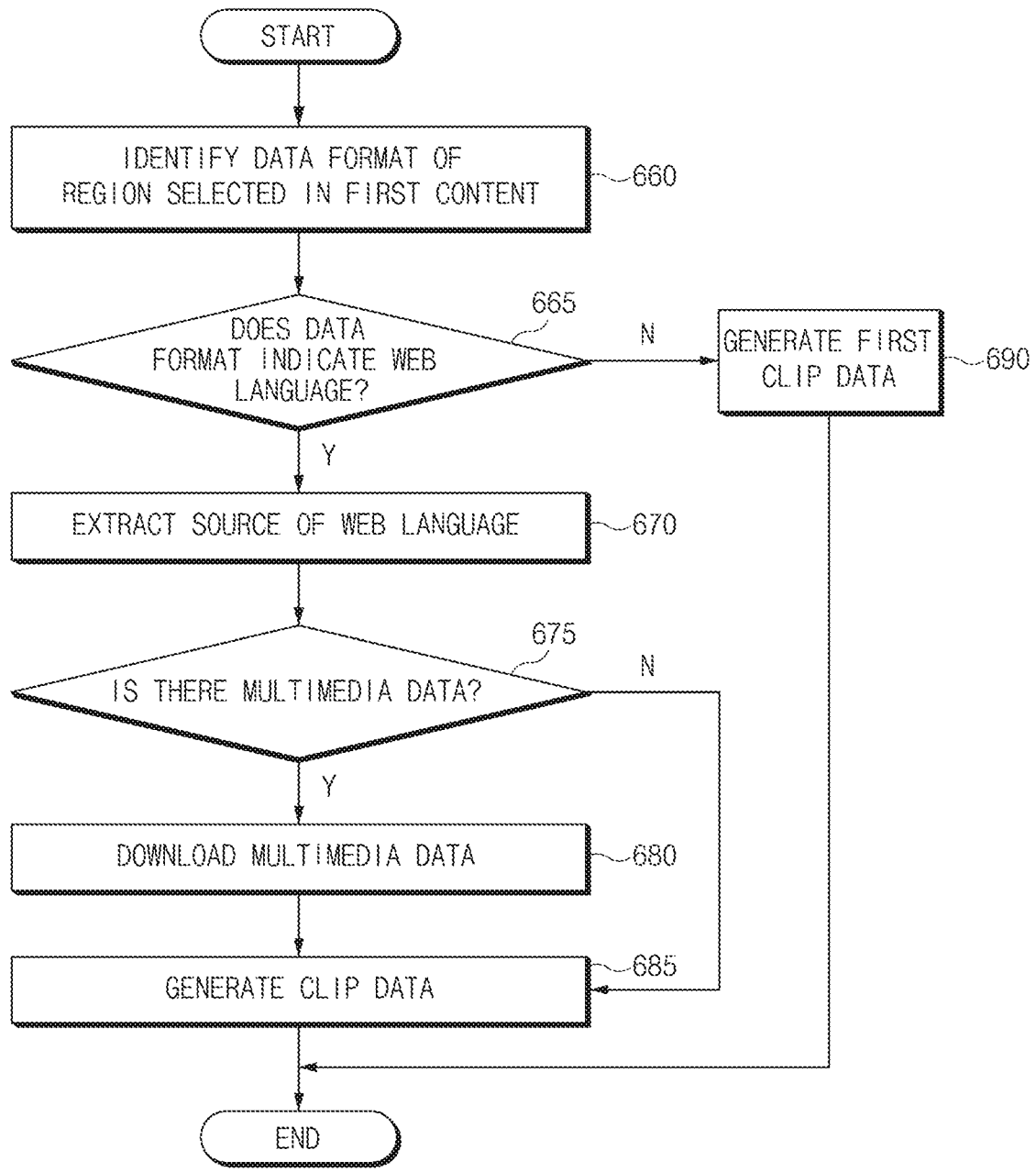
FIG. 6B is a flowchart illustrating a process of generating clip data in an electronic device according to various embodiments of the present disclosure.

FIG. 6B is a flowchart illustrating a process of generating clip data in an electronic device according to various embodiments of the present disclosure.

Referring to FIG. 6B, when generating clip data by copying a selected region, an electronic device 101 of FIG. 1 (e.g., a processor 120 or 420 of the electronic device 101) may identify a data format for the selected region in operation 660.

In operation 665, the electronic device 101 may determine whether the data of the copied region is data configured based on a web language or general data. For example, the electronic device 101 may identify whether the data of the selected region is data provided from a specific server based on a web (hereinafter referred to as "web language format data") or data stored and provided from the electronic device 101 (hereinafter referred to as "general format data").

The identifying of the data format of the selected region may include identifying whether a currently executed application is an application (e.g., a web browsing application or the like), connected to the internet network or a mobile communication network, for displaying data provided form a specific server or an application (e.g., a dialer application) provided from the electronic device 101 itself.

In operation 690, if the data of the copied region is the general format data, the electronic device 101 may generate the first clip data by copying the copied data in the form of original data without change. In this case, if the data of the copied region includes multimedia data such as a still image and a moving image as well as text, the electronic device 101 may generate the first clip data by copying all of the text and the multimedia data.

In operation 670, if the data of the copied region is the web language format data, the electronic device 101 may extract a source for the data of the copied region. For example, the electronic device 101 may extract a tag of a web language (e.g., an HTML, an XML, or the like) configuring the data of the copied region in the first content.

In operation 675, the electronic device 101 may determine whether multimedia data is included in the data of the copied region based on the extracted source. For example, the electronic device 101 may determine whether there is a tag which defines a hyperlink in connection with a still image, a moving image, sound data, and the like based on analyzing a source of the copied region.

If the data of the copied region does not include the multimedia data, in operation 685, the electronic device 101 may generate second clip data based on text configuring the data of the copied region. If the data of the copied region does not include the multimedia data, the electronic device 101 may generate second clip data by copying only text or may generate second clip data based on a web language by maintaining the data of the copied region in the form of a web language (e.g., an HTML, an XML, or the like) without change. In this case, the electronic device 101 may configure the second clip data using a tag which defines details, a letter size, a font, a letter shape, a hyperlink, and the like of text configuring the data of the copied region.

In operation 680, if the data of the copied region includes the multimedia data, the electronic device 101 may download the multimedia data. In operation 685, the electronic device 101 may generate the second clip data based on the downloaded data.

The method of generating the clip data may include at least one of, for example, a first method of downloading and copying multimedia data itself and a second method of copying link information or address information of a web server which stores multimedia data.

If using the first method, the electronic device 101 may generate second clip data based on a web language using text of the data of the copied region and the downloaded multimedia data. In other words, the electronic device 101 may generate the second clip data by a combination of a tag defining text among the data of the copied region and a tag defining multimedia data (e.g., a still image, a moving image, sound data, and the like) stored after being downloaded.

If using the second method, the electronic device 101 may generate second clip data based on a web language using text of the data of the copied region and only link information or address information of a web server which stores multimedia data. In other words, the electronic device 101 may generate the second clip data by a combination of a tag defining the text among the data of the copied region and a tag defining the link information or the address information of the web server which stores the multimedia data.

Figure 7A:
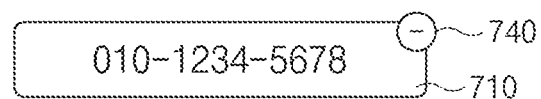
FIGS. 7A, 7B, and 7C are drawings illustrating several forms of a second region displayed on an electronic device according to various embodiments of the present disclosure.
Figure 7B:
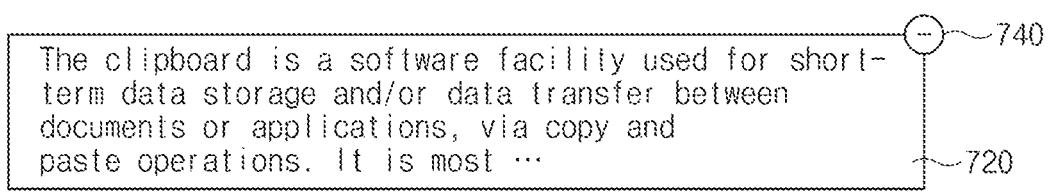
Figure 7C:
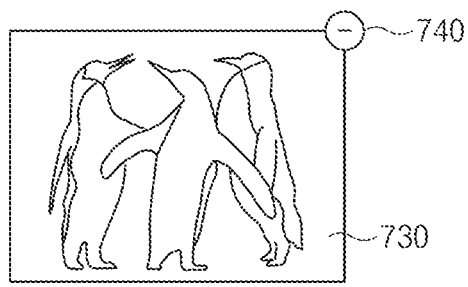

FIGS. 7A, 7B, and 7C are drawings illustrating several forms of a second region displayed on an electronic device according to various embodiments of the present disclosure.

Referring to FIGS. 7A to 7C, the electronic device 101 of FIG. 1 (or the processor 120 or 420 of the electronic device 101) may display data (e.g., typical data and capture data) corresponding to clip data copied from first content as second content 710, 720, or 730 of a pop-up form.

Referring to FIG. 7A, for example, if a phone number displayed on a webpage (or the first content) is selected and copied, the electronic device 101 may display the copied phone number as the second content 710.

Referring to FIG. 7B, for example, if text displayed on the webpage (or the first content) is selected and copied, the electronic device 101 may display at least part of the copied text as the second content 720. In this operation, the electronic device 101 may determine the number of letters included in the selected text to verify whether the determined number of the letters is a number or more of letters. If the number or more of letters (or an amount or more of letters) are included in the copied text, the electronic device 101 may display only the number of letters (or the amount of letters) as the second content 720 and may fail to display the rest. A number of letters (or an amount of letters) which may be displayed as the second content 720 by the electronic device 101 may be set by a manufacturer of the electronic device 101, or a user may specify a number of letters displayed through a setting option or the like of the electronic device 101.

Referring to FIG. 7C, the electronic device 101 may reduce at least part of a portion selected from the first content to a specified size and may display the reduced portion as the second content 730. For example, if an image displayed on a webpage is selected and copied, the electronic device 101 may display the copied image as the second content 730 without change and may display an image which is more reduced in data size than the copied image as the second content 730.

There may be a variety of methods in which the electronic device 101 according to various embodiments displays the second content which has the same size as that of a portion selected from the first content and is reduced in data size. For example, if an image is displayed as the second content, the electronic device 101 may reduce a horizontal, a vertical, or a diagonal size of the selected image or may change a resolution, a luminance, a color, and the like of the image, and may display the reduced image or the changed image as the second content. For example, the electronic device 101 may reduce resolution of an image selected from the first content and may display the reduced image as the second image.

However, embodiments are not limited thereto. For example, if the selected image includes a thumbnail image, the electronic device 101 may display the second content using the thumbnail image. The thumbnail image may refer to an image for display, included in an image file, which is generated by reducing a size of an original image.

According to various embodiments, if a size of a copied image is less than a value, the electronic device 101 may display the copied image as the second content 730 without change. If the size of the copied image is greater than or equal to the value, the electronic device 101 may display an image with low data capacity (e.g., an image which is reduced in size or thumbnail image) as the second content.

According to various embodiments, the electronic device 101 may display a deletion icon 740 for ending the displaying of the second content 710, 720, or 730 of the pop-up form together. The electronic device 101 may end the displaying of the second content 710, 720, or 730 of the pop-up form, displayed on a display 410 of FIG. 4, in response to a signal for selecting the deletion icon 740. However, embodiments are not limited thereto. For example, if a constant time elapses after the second content 710, 720, or 730 of the pop-up form is displayed, the electronic device 101 may end the displaying of the second content 710, 720, or 730.

If the second content 710, 720, or 730 of the pop-up form is not displayed any longer by the deletion icon 740, the electronic device 101 may stop displaying the second icon 710, 720, or 730 of the pop-up form without deleting copied details. Alternatively, the electronic device 101 may provide a menu for displaying the second content obtained from the first content again on a screen where the first content is displayed or a screen where another content changed according to a user input is displayed. In this regard, the electronic device 101 may store the copied details in a memory 130 of FIG. 1 on a temporary basis or on a semi-permanent basis. If a specified menu (or a specified icon) is selected, the electronic device 101 may output the second content 710, 720, or 730, the displaying of which is stopped, on the screen where the first content is displayed or the screen where the other content is displayed again.

FIGS. 8A, 8B, and 8C are drawings illustrating a situation where the displaying of second content is maintained although first content is changed in an electronic device according to various embodiments of the present disclosure.

Referring to FIG. 8A, the electronic device 101 (or the processor 120 or 420 of the electronic device 101) may display first content (e.g., a webpage 810) on the first region 411 of the display 410. The electronic device 101 may display a partial region 815 selected and copied by an external input from the first content 810 as second content 821 on a second region 820. For example, the second region 820 may be of a form of a pop-up window.

Referring to FIG. 8B, the electronic device 101 may change the first content 810 displayed on the first region 411 of the display 410 to another content 830 in response to an external input and may display the other content 830. For example, the electronic device 101 may end the webpage 810 and may output a screen where an SMS/MMS application is executed.

According to various embodiments, although the electronic device 101 changes the first content 810 to the other content 830 and displays the other content 830, it may maintain a state where the second content 821 is displayed. For example, if ending the webpage 810 and executing the SMS/MMS application in response to the external input, the electronic device 101 may maintain a state where the second content 821 is displayed on the second region 820.

Referring to FIG. 8C, in a state where the second content 821 is displayed on the display 410 although the SMS/MMS application is executed after the webpage 810 is ended, a user may perform an input 841 which refers to the second content 821 to the text input window 840 while verifying details of the second content 821.

In other words, the electronic device 101 may display the second content 821 on the second region 820 and may maintain a state where the second content 821 is displayed, during a time or until a user input for removal occurs. Thus, the user may perform a necessary task for continuing verifying the second content 821.

Figures 9A, 9B, 9C:
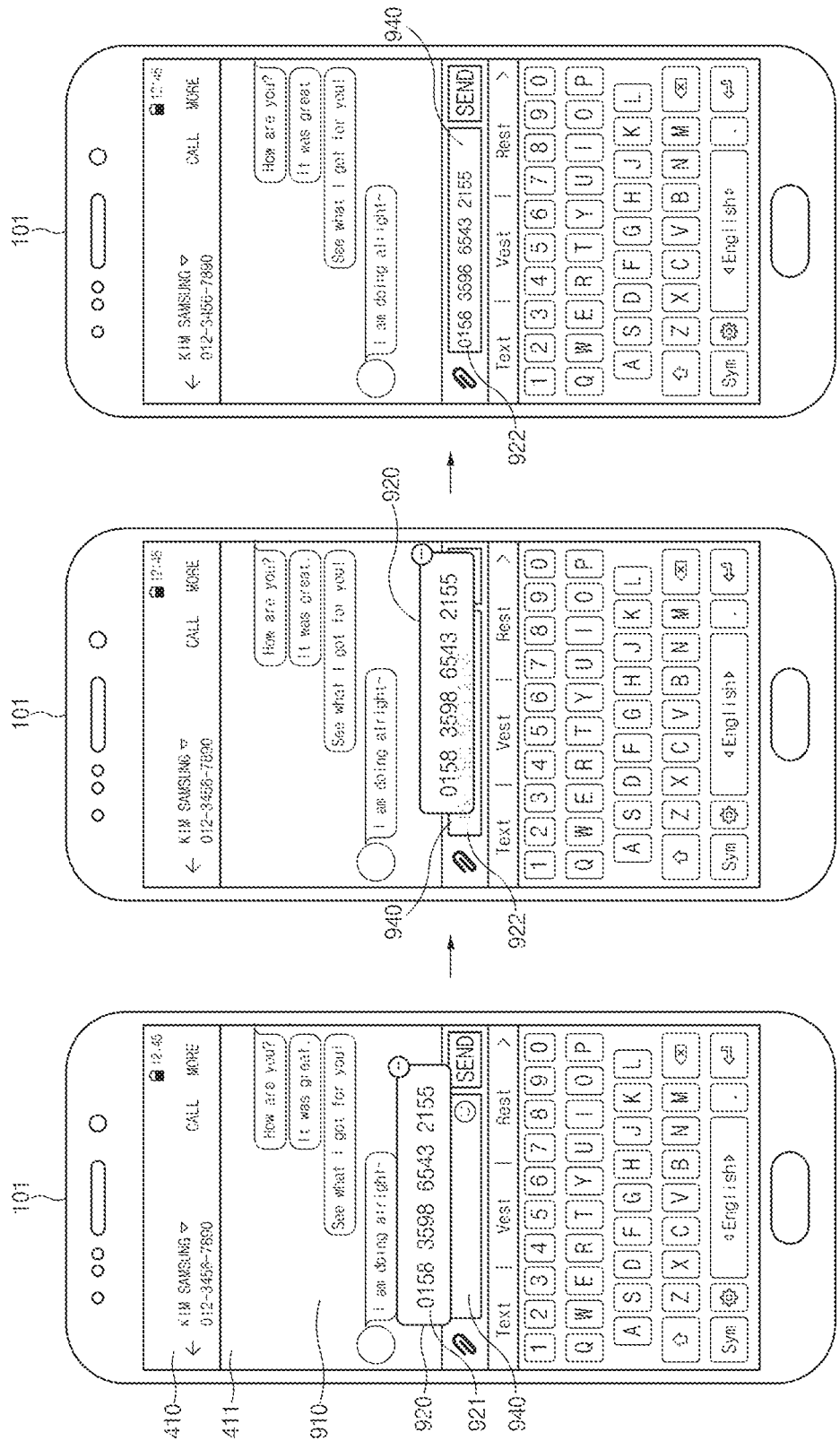
FIGS. 9A, 9B, and 9C are drawings illustrating a situation of pasting second content into a text input window in an electronic device according to various embodiments of the present disclosure.

FIGS. 9A, 9B, and 9C are drawings illustrating a situation of pasting second content into a text input window in an electronic device according to various embodiments of the present disclosure.

Referring to FIG. 9A, while ending first content (e.g., a webpage) from which second content 921 is obtained in response to an external input and outputting a screen where another content is displayed (e.g., a screen where an SMS/MMS application 910 is executed) on the display 410, the electronic device 101 (or the processor 120 or 420 of the electronic device 101) may display the second content 921 on a second region 920 on the screen where the other content is displayed.

Referring to FIG. 9B, the electronic device 101 may paste details of the second content 921 into a text input window 940 of the SMS/MMS application 910 based on a first input generated from the outside.

At least part of the first input may include, for example, an input requested such that the second region 920 is touched and dragged to move to a location of the text input window 940. However, embodiments are not limited thereto. For example, the first input may include an input for performing a long touch on the second region 920 or an input for consecutively touching the second region 920 a plurality of times.

According to various embodiments, if the second region 920 is overlapped with the text input window 940 using a touch and drag by a size or more, the electronic device 101 may provide feedback. For example, if the second region 920 is overlapped with the text input window 940 by the size or more, the electronic device 101 may display second content 922, a font of which is blurred. However, embodiments are not limited thereto. For example, the electronic device 101 may generate vibration or may generate a notification using a sound or an LED (not shown).

Further, if a user ends a touch in a state where the second region 920 is overlapped with the text input window 940 by the size or more, the electronic device 101 may paste the second content 921 into the text input window 940.

FIG. 9C illustrates a state where the electronic device 101 pastes details of the second content 921 into the text input window 940 of the SMS/MMS application 910 based on the first input generated from the outside.

As such, since the electronic device 101 displays the second content 921 into the second region 920 and maintains a display state during a time, the user may paste the second content 921 into another application by only a simple operation.

Figure 10C:
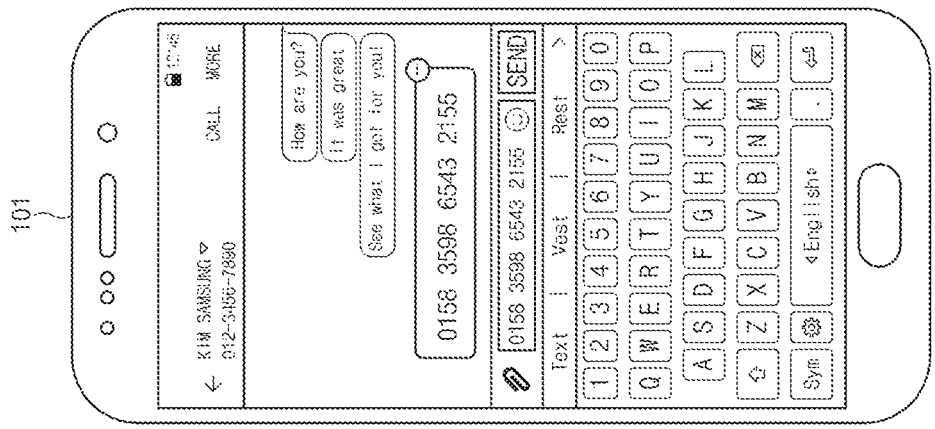
FIGS. 10A, 10B, and 10C are drawings illustrating a situation where a second region automatically disappears in an electronic device according to various embodiments of the present disclosure.
Figure 10B:
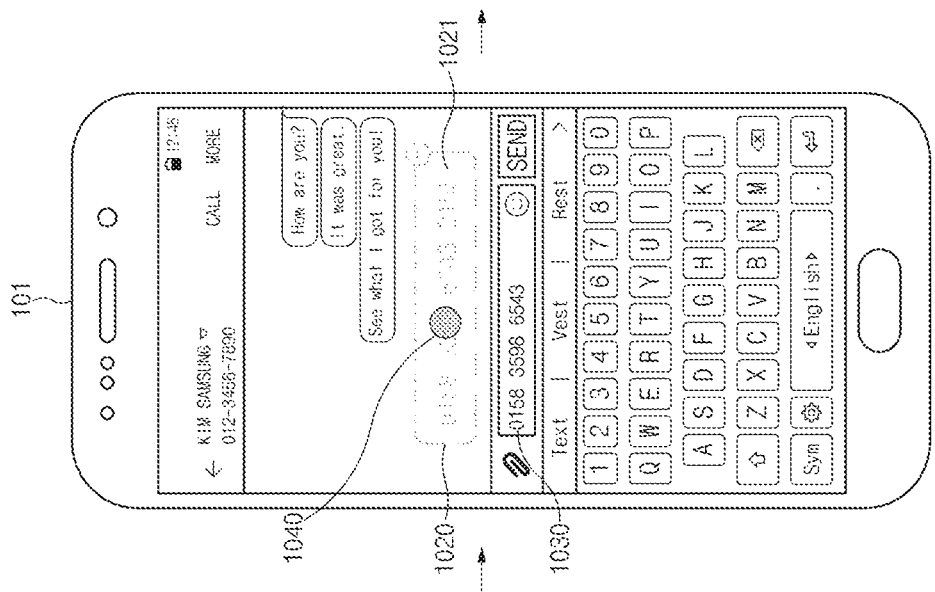
Figure 10A:
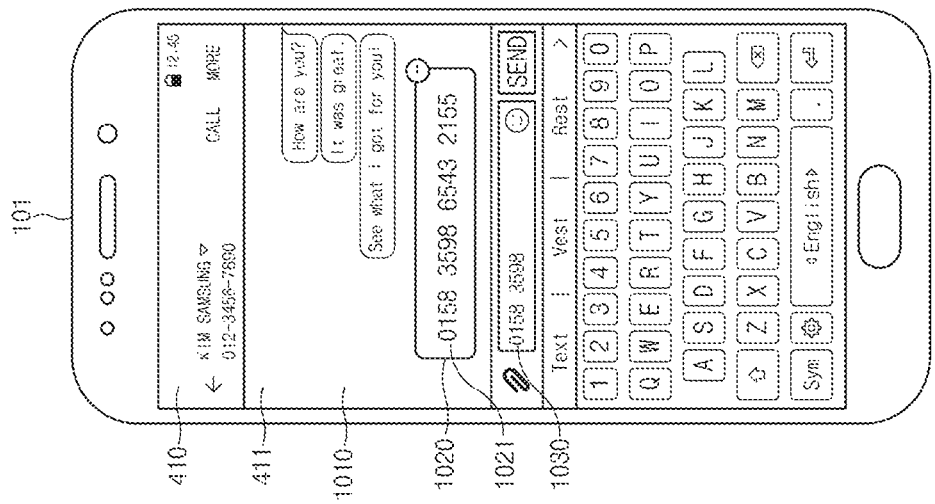

FIGS. 10A, 10B, and 10C are drawings illustrating a situation where a second region automatically disappears in an electronic device according to various embodiments of the present disclosure.

FIG. 10A illustrates a state where the electronic device 101 (or the processor 120 or 420 of the electronic device 101) changes first content (not shown) displayed on the first region 411 of the display 410 to another content 1010 and displays the other content 1010 in response to an external input. For example, the electronic device 101 may end a webpage (not shown) and may execute the SMS/MMS application 1010.

According to various embodiments, although the electronic device 101 changes the first content (not shown) to the other content 1010 and displays the other content 1010, it may maintain a state where second content 1021 obtained from the first content is displayed on the second region 1020. For example, if ending the webpage (not shown) in response to an external input and executing the SMS/MMS application, the electronic device 101 may maintain a state where the second content 1021 is displayed on the second region 1020.

In this case, a user may enter the same details as those of the second content in a text input window 1030 of the SMS/MMS application 1010 while viewing the second content 1021.

Referring to FIG. 10B, if a time elapses, the electronic device 101 may display the second content 1021 located on the second region 1020 to become more and more blurred and may end the displaying of the second content 1021. In this case, the electronic device 101 may initialize progress of the time when the second content 1021 disappears, based on receiving a second input 1040. The second input 1040 may be, for example, an operation of touching the second region 1020 or an operation of operating a physical key mounted on the electronic device 101.

According to various embodiments, if it is determined as a situation where text is entered in the text input window 1030, the electronic device 101 may fail to progress the time when the second content 1021 disappears. Thus, the user enters text in the text input window 1030 without performing an additional operation for stopping progressing the time when the second content 1021 disappears.

FIG. 10C illustrates a state where the electronic device 101 clearly displays the second content 1021, displayed to be gradually blurred based on the second input 1040 generated from the outside, again. As such, the user may stop the second content 1040 disappearing by only a simple operation.

FIGS. 11A, 11B, 11C, and 11D are drawings illustrating a situation where a second region disappears in stages in an electronic device according to various embodiments of the present disclosure.

Referring to FIG. 11A, the electronic device 101 of FIG. 1 (or the processor 120 or 420 of the electronic device 101) may end displaying of a screen where first content is displayed (e.g., a screen where an SMS/MMS application is executed) in response to an external input and may display a second region 1120 including second content 1121 on a screen where another content, for example, a webpage 1110 is executed.

In this case, a user may enter the same details as those of the second content 1121 in a text input window 1130 of the webpage 1110 while viewing the second content 1121.

Referring to FIGS. 11B to 11D, the electronic device 101 according to various embodiments may change a state where at least part of the second content 1121 is displayed, based on details entered in the text input window 1130 (e.g., information written by a user input). For example, the electronic device 101 may determine whether the details entered in the text input window 1130 are the same as those of the second content 1121 and may change a state where at least part of the same details of the second content 1121 as the input details is displayed.

According to various embodiments, if the details entered in the text input window 1130 are the same as those of the second content 1121, the electronic device 101 may display the second content 1121 to be blurred, may make the second content 1121 not to be shown, or may change a color of the second content 1121 to a first color to display the second content 1121 in the first color.

If the details entered in the text input window 1130 are not identical to the details of the second content 1121, the electronic device 101 may fail to change the second content 1121 or may change a color of the second content 1121 to a second color different from the first color to display the second content 1121 in the second color.

Further, if the details entered in the text input window 1130 are not identical to the details of the second content 1121, the electronic device 101 may generate vibration or may emit light of an LED (not shown) in a specified color to provide a notification to the user.

In more detail, referring to FIG. 11B, if first details 1121-1 of the second content 1121 are entered in a first item 1130-1 of the text input window 1130, the electronic device 101 may display the first item 1121-1 of the second content 1121 to be blurred.

Referring to FIG. 11C, if second details 1121-2 of the second content 1121 are entered in a second item 1130-2 of the text input window 1130, the electronic device 101 may display the second item 1121-2 of the second content 1121 to be blurred.

Referring to FIG. 11D, if third details 1121-3 and fourth details 1121-4 of the second content 1121 are entered in a third item 1130-3 and a fourth item 1130-4 of the text input window 1130, respectively, the electronic device 101 may display the third item 1121-3 and the fourth item 1121-4 of the second content 1121 to be blurred.

As such, as the electronic device 101 changes and displays the second content 1121 in response to entering the same details as those of the second content 1121 in the text input window 1130, the user may verify whether details which are being input in real time are accurately input.

The term "module" used in this disclosure may include a unit configured with hardware, software, or firmware. For example, the term "module" may be interchangeably used with the term "logic", "logical block", "component", "circuit" or the like. The "module" may be a minimum unit of an integrated component or for performing one or more functions or may be part thereof.

The "module" may be implemented mechanically or electronically. For example, the "module" may include an application-specific IC (ASIC) chip, a field-programmable gate array (FPGA), and a programmable-logic device for performing some operations, which are known or will be developed.

At least part of an apparatus (e.g., modules or functions thereof) or a method (e.g., operations) according to various embodiments may be implemented by instructions stored in a computer-readable storage media (e.g., a memory 130 of FIG. 1) in the form of a program module. The instruction, when executed by a processor (e.g., a processor 120 of FIG. 1), may cause the processor to perform a function corresponding to the instruction. The computer-readable storage medium may include a hard disk, a floppy disk, a magnetic media (e.g., a magnetic tape), an optical media (e.g., a compact disc read only memory (CD-ROM) and a DVD, a magneto-optical media (e.g., a floptical disk)), an internal memory, and the like. An instruction may include a code generated by a compiler or a code executable by an interpreter.

A module or a program module according to various embodiments may include at least one or more of the above elements, or part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

The electronic device according to various embodiments may display a region selected and copied from the first content displayed on the first region of the display as the second content on the second region different from the first region. Thus, the user may verify details of the copied region before pasting the details and simultaneously or sequentially paste or use the copied region.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a memory; and
   a processor electrically connected with the display and the memory and configured to:
      display first content on a first screen region of the display,
      receive a first user input associated with copying at least part of the first content,
      obtain at least a partial screen region corresponding to the at least part of the first content as a copy region in response to the first user input,
      display at least part of data corresponding to the copy region as second content on a second screen region of the display,
      maintain a state where the second screen region which displays the second content is displayed while the first content is changed to another content,
      control the display to display an input window,
      compare details entered in the input window with at least part of the second content, and
      change at least one of a luminance, a color, or a saturation of at least part of the second content corresponding to the details entered in the input window displayed on the second region,
   wherein, if the second content is text, the processor is further configured to:
      display the entire text as the second content if the number of letters configuring the text is less than a predetermined number of letters, and
      display the number of letters in the text as the second content if the number of the letters configuring the text is greater than or equal to the predetermined number of letters.

2. The electronic device of claim 1, wherein the processor is further configured to:
   receive a second user input; and
   move the second screen region to a location corresponding to the second user input on a display region of the display.

3. The electronic device of claim 1,
   wherein the display is configured to display an input window, and
   wherein the processor is further configured to, if a second user input signal is received on the second screen region, enter the at least part of the data corresponding to the copy region in the input window.

4. The electronic device of claim 1, wherein the display is configured to display an input window, and
wherein the processor is further configured to:
move the second screen region in response to a second user input signal, and
if a region where the moved second screen region is overlapped with the input window is greater than or equal to a size, enter the at least part of the data of the copy data in the input window.

5. The electronic device of claim 1, wherein the processor is further configured to, if a time elapses after the second content is displayed, end the displaying of the second content.

6. The electronic device of claim 5, wherein the processor is further configured to, if a second user input signal is received on the second screen region before the displaying of the second content is ended, initialize progress of the time.

7. The electronic device of claim 1, wherein, if the second content is an image, the processor is further configured to:
display the image as the second content if a display size of the image is less than a value, and
display a reduction image in which the image is reduced to a size or a thumbnail image associated with the image as the second content if the display size of the image is greater than or equal to the value.

8. A method for controlling an electronic device including a display, the method comprising:
displaying first content on a first screen region of the display;
receiving a first user input associated with copying at least part of the first content;
obtaining at least a partial region of the first content as a copy region in response to the first user input;
displaying at least part of data corresponding to the copy region as second content on the display;
maintaining a state where a second screen region which displays the second content is displayed while the first content is changed to another content;
displaying an input window on the display;
comparing details entered in the input window with at least part of the second content; and
changing at least one of a luminance, a color, or a saturation of at least part of the second content corresponding to the details entered in the input window displayed on the second region,
wherein the displaying at least part of data corresponding to the copy region as second content comprises:
if the second content is text, displaying the entire text as the second content if the number of letters configuring the text is less than a predetermined number of letters; and
displaying the number of letters in the text as the second content if the number of the letters configuring the text is greater than or equal to the predetermined number of letters.

9. The method of claim 8, further comprising:
receiving a second user input; and
moving the second screen region to a location corresponding to the second user input on a display region of the display.

10. The method of claim 8, further comprising:
displaying an input window on the display;
receiving a second user input signal on the second screen region; and
entering the at least part of the data corresponding to the copy region in the input window in response to the second user input.

11. The method of claim 8, wherein the maintaining of the state where the second screen region which displays the second content is displayed while the first content is changed to the other content further comprises:
if a time elapses, ending the displaying of the second content.

12. The method of claim 11, wherein the ending of the displaying of the second content if the time elapses comprises:
if a second user input signal is received on the second screen region before the displaying of the second content is ended, initializing progress of the time.

13. The method of claim 8, further comprising:
if the second content is an image, displaying the image as the second content if a display size of the image is less than a value and displaying a reduction image in which the image is reduced to a size or a thumbnail image associated with the image as the second content if the display size of the image is greater than or equal to the value.

14. A non-transitory storage medium storing embodied thereon a program for executing a method for controlling an electronic device including a display, the method comprising:
displaying first content on a first screen region of the display;
receiving a user input associated with copying at least part of the first content;
obtaining at least a partial region of the first content as a copy region in response to the user input;
displaying at least part of data corresponding to the copy region as second content on the display;
maintaining a state where a second screen region which displays the second content is displayed while the first content is changed to another content;
displaying an input window on the display;
comparing details entered in the input window with at least part of the second content; and
changing at least one of a luminance, a color, or a saturation of at least part of the second content corresponding to the details entered in the input window displayed on the second region,
wherein the displaying at least part of data corresponding to the copy region as second content comprises:
if the second content is text, displaying the entire text as the second content if the number of letters configuring the text is less than a predetermined number of letters; and
displaying the number of letters in the text as the second content if the number of the letters configuring the text is greater than or equal to the predetermined number of letters.

* * * * *